Patented Sept. 29, 1942

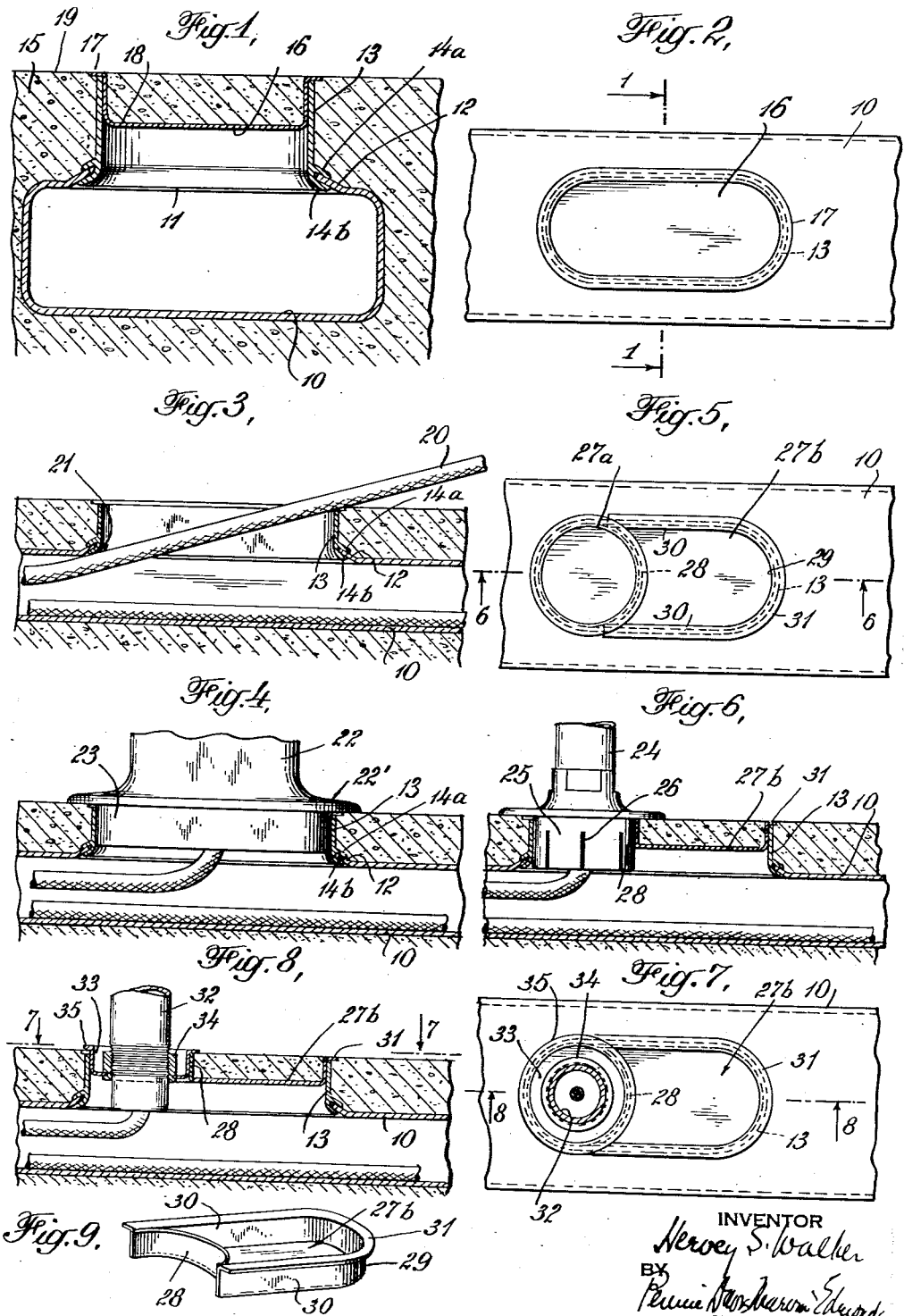

2,297,179

UNITED STATES PATENT OFFICE 2,297,179

UNDERFLOOR DUCT SYSTEM

Hervey S. Walker, Ardmore, Pa.

Application April 19, 1941, Serial No. 389,380

2 Claims. (Cl. 72—16)

This invention relates to systems of electrical wiring for installation in buildings, preferably during the course of construction thereof, and is concerned more particularly with a novel system of the concealed type comprising ducts through which the conductors are led and which are placed either in the floors or the walls or partitions of the building.

In modern buildings, especially office buildings, it has become common practice to install ducts in the floors to provide different kinds of electrical service, as, for example, high tension wiring for lighting and small power devices, low tension wiring for signal systems, and telephone wiring. In such underfloor duct systems, the ducts are metal tubes of generally rectangular cross-section or fibre conduits, arranged in single or multiple runs, depending on the number of different services to be provided, with adjacent runs lying parallel, for example, and spaced apart distances which depend on the use to which the floor area is to be put. The parallel runs of ducts are connected by ducts for supply lines and junction and outlet boxes, in which electrical connections can be made, are provided at the points of intersection.

Service is made available at a particular point along a duct through an opening in the top wall of the duct and through an outlet leading from the top of the duct to the floor surface. In the pre-set system disclosed in my Patent No. 1,592,548, issued July 13, 1926, the outlets are tubular metallic inserts of circular cross-section mounted in openings spaced along the ducts at regular intervals and each such insert extends substantially to the finished floor surface and its upper end is closed by a cap having a central depression in which floor material is received. The rims of the caps are either exposed at the surface or covered by only a thin layer of floor material and the locations of the inserts can be readily determined. When electrical service is desired at a particular point on the floor area, the cap of the nearest insert is removed and conductors connected to the proper supply lines in the nearest junction box are fished through the duct and out through the open insert. The ends of the conductors are then led through an outlet fitting or standpipe which has a neck received in the insert and extends up above the floor surface. The standpipe may have openings at the top through which the conductors are led or may contain an electrical receptacle to the terminals of which the conductors are connected.

In underfloor systems as heretofore constructed, the inserts or outlets leading from the ducts to the floor surface have ordinarily been of circular cross-section and the diameter of each such insert is substantially less than the transverse dimension of the duct. Accordingly, when a conductor is to be led from a box and through a duct and out through such an insert, it must be pulled upwardly from the insert at a steep angle and as it is advanced, the insulation on its outer surface bears against the lower edge of the insert at the side adjacent the duct. Because of the sharp bend made by the conductor in passing from the duct to the insert, a heavy pull is required to draw the conductor along and the operation is a laborious one, especially if the conductor is of relatively large size, such as a cable. Also, the pressure with which the insulation is forced against the lower edge of the insert may cause it to become damaged.

The present invention is, accordingly, directed to the provision of an underfloor duct system which includes ducts of novel construction, these ducts having outlet inserts which lead to the floor surface and through which wiring can be drawn with relative facility and without injury to the outer covering thereof. The inserts are provided with novel closure caps and the caps are so constructed that standpipes of various types may be mounted therein.

For a better understanding of the invention, reference may be had to the accompanying drawing in which Fig. 1 is a transverse section on the line 1—1 of Fig. 2 through a duct and outlet insert used in the new system;

Fig. 2 is a fragmentary plan view of a duct used in the new system, the view showing one insert;

Fig. 3 is a longitudinal sectional view through one of the new ducts showing a conductor being drawn through an outlet;

Fig. 4 is a view similar to Fig. 3 showing the duct with a standpipe in place;

Fig. 5 is a plan view similar to Fig. 1 showing a modified closure cap;

Fig. 6 is a sectional view similar to Fig. 4 showing a standpipe used with the cap illustrated in Fig. 5;

Fig. 7 is a sectional view on the line 7—7 of Fig. 8 showing a different type of closure cap with a standpipe in place therein;

Fig. 8 is a sectional view on the line 8—8 of Fig. 7 with the standpipe shown in elevation; and Fig. 9 is a view in perspective of a part of the cap shown in Fig. 5.

There is illustrated in Fig. 1 one run of a concealed wiring system of the invention and the system includes a wiring duct in the form of a metal tube 10 which is of horizontally elongated generally rectangular cross-section. The duct is provided with a plurality of openings 11 in its upper wall and preferably these openings are at regular intervals along the duct, as, for example, on 24" centers. The openings are elongated lengthwise of the duct, as, for example in a duct 3" wide and 1" in internal diameter, each opening may have a length of 4¼". The openings preferably have parallel sides and rounded ends and the distance between the sides may be 1½".

The upper wall of the duct is dished upwardly around each opening, as indicated at 12, and mounted on the dished-up portion is an insert 13 which is of the same cross-sectional shape as the opening and is provided with a pair of peripheral flanges 14a, 14b at its lower end. These flanges bear against opposite faces of the portion 12 and hold the insert firmly in place, the lower flange then lying either above or in the plane of the inner surface of the duct around the portion 12. When the system is installed, the duct is embedded within the floor material 15 and wholly concealed and the inserts extend upwardly substantially to the finished floor surface. The height of the inserts may, accordingly, vary but ordinarily the insert height may be approximately 1".

The upper end of each insert is closed by a cap 16 which is provided with a peripheral flange 17 overlying the upper end of the insert and has a central depressed portion 18 in which floor material may be received. The cross-sectional shape of the depressed portion is similar to that of the insert so that the depressed portion fits inside the insert with a snug fit.

In the completed system, the caps of the inserts lie with their flanges 17 either exposed at the finished floor surface 19 or only slightly below that surface and when service is desired at or near a particular insert, the cap is pried loose and a conductor 20 is fished from the nearest box to the insert. The end of the conductor is then passed up through the insert and so much of the conductor is pulled out of the insert as may be necessary to make the desired connections. Since the insert is of much greater length than the diameter of a circular insert that could be used in a duct of the same width and the long dimension of the insert extends lengthwise of the duct, the conductor may be pulled through the duct and out the insert by a pull applied at a low angle to the horizontal. While the conductor bears against the edge 21 of the lower end of the insert at the side nearer the box while the conductor is bing pulled out of the insert, the bend that the conductor must make to pass out of the insert is relatively slight and thus the pulling of the conductor does not cause its surface to bear heavily against the lower end of the insert. It is, therefore, much easier to pull the conductor out through the insert than through the circular inserts heretofore employed and also there is much less likelihood of injury being done to the insulation or sheath of the conductor by its contact with the lower end of the insert.

After the desired length of the conductor has been exposed through the insert, the exposed end is passed upward through a standpipe 22 and then led through an outlet opening near the top of the standpipe or connected to the terminals of a receptacle mounted in the standpipe. The standpipe is provided with a flange 22', which extends outwardly beyond the edge of the insert and rests in contact with the floor surface, and with a neck 23, which projects downwardly below the flange and is of the same cross-sectional shape as the interior of the insert so that it fits snugly therein.

The cap 16 shown in Figs. 1 and 2 has a central depressed portion fitting snugly within the insert, and upon removal of the cap, the entire end of the insert is open so that the standpipe used must have a neck of the same cross-sectional shape as the interior of the insert. In some cases, however, it may be desirable to use a standpipe 24, such as is shown in Fig. 6, which has a neck 25 of circular cross-section, the neck being cut as at 26 so that the portions between the cuts may be expanded to grip the insert. When such a standpipe is to be used, the insert is closed by a cap made up of two parts 27a and 27b.

The part 27a of the cap has a peripheral flange and a central depressed portion which is of circular cross-section and this portion is formed on the same radius as the curved ends of the insert. The part 27b has a concave end 28 which fits closely against the outer surface of the depressed portion of the part 27a and its other end 29 is convexly curved to fit within the curved end of the insert. The side walls 30 of part 27b are parallel and fit against the parallel sides of the insert. When the two parts of this cap are placed in the insert, a peripheral flange on the part 27a overlies the curved end of the insert and the remainder of the top of the insert is covered by a flange 31 on part 27b.

When a cap 27a, 27b is employed, the entire cap may be removed when a standpipe similar to that designated 22 is used, but if a standpipe similar to that designated 24 is employed, the part 27a of the cap is replaced by the standpipe and the remainder of the end of the insert is closed by part 27b.

Certain standpipes now employed are mounted in place by being screwed into inserts having threaded necks or into bushings mounted expansibly in inserts. Such a standpipe is indicated at 32 and when a standpipe of this type is used, the part 27a of the cap is removed and replaced by a bushing 33 which has a central opening surrounded by a sleeve 34 which is either internally threaded or has a smooth inner surface. The bushing has a peripheral flange 35 overlying the top of the insert and a part of cap member 27b.

In all the constructions described, the entire top of the insert is opened whenever a conductor is to be drawn out of the duct and since the insert is elongated lengthwise of the duct, the conductor can be pulled out at a low angle. The shape of the insert thus facilitates pulling of the conductor and also reduces the liability of injury to the outer covering thereon. The inserts are preferably mounted in the duct at such closely spaced regular intervals that a greater number of inserts is provided than will actually be used. With such a short spacing between the inserts, it is ordinarily possible to find an insert available either immediately at or only a short distance from the point where service is required and this avoids running conductors from the standpipes along the floor to the actual point of use.

In certain duct systems, known as "after-set"

systems, connections are made to the wiring within a duct by removing floor material from over the top of the duct and drilling a hole in the latter through which the conductors are drawn. An insert is then mounted in the opening, the floor patched around the insert, and a standpipe mounted in the insert. With such a system, the conductors can be drawn out of the duct at a low angle, if a considerable quantity of floor material is removed from the duct around the opening therein. Such a system, however, has the serious objections that whenever connections are required, the floor must be chipped away, an opening drilled into the duct, an insert mounted therein, and the floor finally patched. The making of such a connection is thus not only laborious and time consuming but involves substantial expense.

The present system avoids the difficulties heretofore present in both after-set and pre-set systems and makes available outlets from the duct which have the form of metal-lined passages and through which conductors can be drawn easily and without liability to damage. The new system thus affords advantages over both of the prior systems.

I claim:

1. A duct for use in a concealed wiring system and adapted to be disposed wholly within a floor structure at a substantial distance below the finished floor surface, which comprises a metal tube of generally rectangular cross-section and having a plurality of openings in its upper wall at intervals, each opening being elongated lengthwise of the tube and having generally parallel sides and rounded ends, a tubular insert mounted in each opening and extending upwardly from the tube substantially to the finished floor surface, the insert being of the same cross-sectional shape as the opening, and a removable multi-part cap closing the upper end of the insert, at least one part at one end of the cap being of circular cross-section.

2. In an underfloor duct system, the combination of a metal tube of generally rectangular cross-section mounted within the floor structure at a distance below the finished floor surface, the tube having an opening in its upper surface having generally parallel sides extending lengthwise of the tube and rounded ends, a tubular insert mounted in the opening and extending upwardly from the tube substantially to the finished floor surface, the insert being of the same general cross-sectional shape as the opening, a cap closing part of the upper end opening of the insert, the cap having a curved wall at one end which with the adjacent inner wall of the insert defines a circular opening, and an outlet fitting having a neck of circular cross-section entering said circular opening, said neck having expanded portions which tightly engage the walls defining the opening and hold the cap in firm engagement with the curved end wall of the insert remote from said opening.

HERVEY S. WALKER.